H. W. SCHATZ.
VARIABLE SPEED MECHANISM.
APPLICATION FILED DEC. 28, 1908.
952,050.
Patented Mar. 15, 1910.
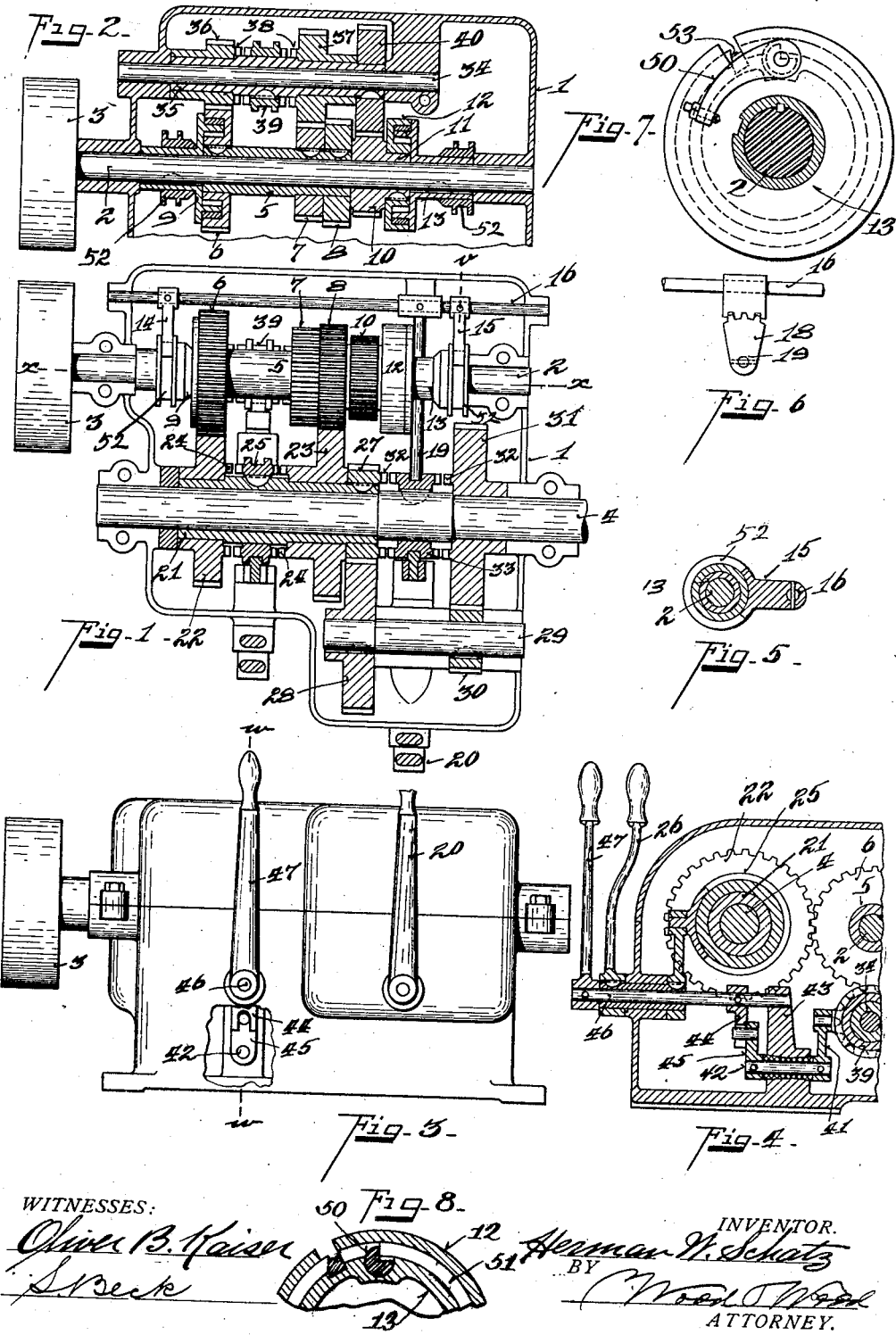

UNITED STATES PATENT OFFICE.

HERMAN W. SCHATZ, OF CINCINNATI, OHIO, ASSIGNOR TO THE AMERICAN TOOL WORKS COMPANY, OF CINCINNATI, OHIO, A CORPORATION OF WEST VIRGINIA.

VARIABLE-SPEED MECHANISM.

952,050.　　　　　Specification of Letters Patent.　　Patented Mar. 15, 1910.

Application filed December 28, 1908. Serial No. 469,569.

*To all whom it may concern:*

Be it known that I, HERMAN W. SCHATZ, a citizen of the United States, residing at Cincinnati, in the county of Hamilton and State of Ohio, have invented certain new and useful Improvements in Variable-Speed Mechanism, of which the following is a specification.

My invention relates to an improvement in a variable speed system, primarily adapted for a head-stock of a lathe.

The object of my invention is to provide a system of gearing and clutches, whereby a variety of speed change effects may be obtained by shifting the clutches.

The features of the invention are more fully set forth in the description of the accompanying drawings, forming a part of this specification, in which:—

Figure 1 is a central horizontal section through my improvement. Fig. 2 is a section on line $x$, $x$, Fig. 1. Fig. 3 is a side elevation of the same. Fig. 4 is a section on line $w$, $w$, Fig. 3. Fig. 5 is a section on line $v$, Fig. 1. Fig. 6 is a detailed elevation of one of the clutch shifting devices. Fig. 7 is an end elevation of the friction clutch. Fig. 8 is a central vertical section through a portion of the same.

1 represents the casing which is shown as adapted to be applied to the bed of a lathe.

2 represents a driving shaft and 3 a pulley fixed to said shaft for driving the same.

4 represents the driven shaft or spindle, suitably journaled within the casing 1.

5 represents a sleeve, loose on shaft 2, carrying gears 6, 7, and 8, fixed thereto.

9 represents a friction clutch splined upon shaft 2, adapted to be clutched frictionally with gear 6.

10 represents a gear loose on shaft 2, having a sleeve projection 11, to which is keyed the friction clutch casing 12.

13 represents a friction clutch member splined upon shaft 2 for locking the gear 10 in driving relation with shaft 2.

14, 15, represent yoke arms fixed to the rod 16 for actuating the clutches simultaneously, so as to prevent both friction members from being clutched to their respective gears at the same time.

The friction clutches employed are constructed in a well known manner in which the member 13 carries a swinging arm 50 adapted to engage against the friction ring 51 seated between a flange projecting from member 13 and member 12. 52 represents a collar adapted to engage the free end of the arm 50 for locking the ring into frictional contact with the member 12. The ring is secured to the member 13 by a key 53. The collar 52 being actuated by the yoke arm 15. The friction clutch for clutching gear 6 with shaft 2 is constructed in the same manner.

17 represents a rack plate fixed to the rod 16, and 18 represents a segment fixed upon the actuating rod 19, controlled by lever 20.

21 represents a sleeve loose on shaft 4.

22 represents a gear loose on sleeve 21 and in mesh with gear 6 upon shaft 2.

23 represents a gear loose on sleeve 21 in mesh with gear 8 on shaft 2.

The gears 22, 23, are provided with clutch teeth 24, adapted to be alternately engaged with the teeth of the shifting clutch member 25, keyed to the sleeve 21, said clutch member 25 being actuated by the lever 26, see Fig. 4.

27 represents a gear fixed to the sleeve 21 in mesh with a gear 28 fixed to the stud shaft 29.

30 represents a gear fixed to the shaft 29, in mesh with a gear 31 loose on the driving shaft 4.

The gears 27 and 31 are each provided with the clutch teeth 32 adapted to be engaged alternatively by the teeth of the shifting clutch member 33.

34 represents a rod for supporting the sleeve 35, said sleeve being provided with a gear 36 loose thereon and in mesh with gear 6 on shaft 2.

37 represents a gear loose on sleeve 35 in mesh with gear 7 on shaft 2.

The gears 36, 37, are provided with clutch teeth 38, adapted to be engaged with the teeth of the clutch member 39.

40 represents a gear fixed to sleeve 35 in mesh with gear 10 on shaft 2.

41 represents a lever engaging the clutch member 39 fixed to the rock shaft 42 mounted in the bearing 43.

45 represents a lever fixed to the rock shaft 42, having engagement with the lever arm 44, fixed to the rod 46, passing through the shifting lever 26 and actuated by the hand lever 47.

By the arrangement of gearing and clutch mechanism herein described, the following speed changes, through the various trains of gearing, can be obtained:—

1. Assume that clutch member 9 is thrown into engagement with gear 6, clutch member 25 with gear 22 and clutch member 33 with gear 27, motion will be imparted from shaft 2 through gears 6, 22, sleeve 21, and through clutch member 33 to shaft 4, as a prime speed.

2. A second change is produced by throwing clutch member 33 into engagement with gear 31, with the remainder of clutch as described for the first speed, producing a back gear speed from gear 27, through gears 28, 30 and 31, to shaft 4. In each instance of change, a prime speed can be obtained by throwing clutch member 33 into engagement with gear 27, and a second back gear speed by throwing the clutch into engagement with gear 31.

3. Throwing clutch members 9, 25, and 33 into engagement respectively with gears 6, 23, and 27, whence motion will be imparted from shaft 2, through gear 6, sleeve 5, gears 8, 23, to shaft 4, through clutch member 33 and gear 27.

4. Changing clutch member 33, so as to bring it into engagement with gear 31, produces the back gear speed effect through the train described for the third change.

5. Releasing clutch 9, throwing clutch 13 into engagement with gear 10 and throwing clutch member 39 into engagement with gear 36 and clutch member 25 into engagement with gear 22, clutch member 33 into engagement with gear 27, power is transmitted through the following train:—from gear 10, through gear 40, sleeve 35, clutch member 39, gears 36, 6, and 22, thence through clutch member 25, sleeve 21 and clutch member 33, driving shaft 4, constituting the fifth change.

A sixth change is effected by throwing clutch member 33 into engagement with gear 31 with the clutches in position for the remainder of the gears of the train, just described, whereby motion is imparted to sleeve 21, gears 27, 28, 30, 31, to shaft 4.

A seventh change is effected by throwing clutch member 39 into engagement with gear 37 and clutch member 25 into engagement with gear 23, clutch member 33 into engagement with gear 27, whereby motion will be imparted from gear 10, through gear 40, clutch member 39, gears 37, 7, 8, gears 23, clutch member 25 driving sleeve 21, thence through clutch member 33, driving shaft 4.

An eighth change is effected by throwing clutch member 33 into engagement with gear 31, whereby the following train of gearing system is brought into action:—from gear 10 through gear 40, clutch member 39, gears 37, 7, 8, and 23, clutch member 25, sleeve 21, gears 27, 28, 30 and 31, thence through clutch member 33 to shaft 4.

A ninth change is effected by throwing clutch member 13 into engagement with gear 10, clutch member 39 into engagement with gear 37, clutch member 25 into engagement with gear 22 and clutch member 33 into engagement with gear 27, the motion with the clutches in this position will be from gear 10, through gear 40, sleeve 35, clutch 39, thence through gears 37, 7, sleeve 5, gears 6, 22, through clutch 33, driving shaft 4.

A tenth change can be obtained by throwing clutch member 33 into engagement with gear 31, whence the motion will be the same as described for change nine to sleeve 21, whence the motion will be through gears 27, 28, 30, 31, clutch 33 driving shaft 4.

An eleventh speed effect can be obtained by throwing clutch member 13 into engagement with gear 10, clutch member 39 in engagement with gear 36 and clutch member 25 in engagement with gear 23, clutch member 33 into engagement with gear 27, whence motion will be transmitted from gear 10 through gear 40, sleeve 35, clutch member 39, gears 36, 6, sleeve 5, gears 8, 23, thence through clutch member 25, sleeve 21 and clutch member 33.

A twelfth change is effected by shifting clutch member 33 into engagement with gear 31, the remaining clutches standing in the position described for the eleventh change, which will bring gears 27, 28, 30 and 31 into commission and thence through clutch member 33 driving shaft 4.

Having described my invention, I claim:—

1. In a variable speed system of gearing, a first shaft, a series of gears loose thereon, clutching devices engaging said gears in driving relation with said shaft, a second shaft, a sleeve loose thereon, a pair of gears loose on said sleeve in mesh respectively with gears on the first shaft, clutching devices for alternately connecting said gears to said sleeve, a pair of gears loose on said second shaft, one of which is in driving connection with said sleeve, clutching devices for alternately connecting said gears to said second shaft, a third shaft, and a series of gears fixed thereon in mesh respectively with said gears loose on said second shaft, substantially as described.

2. In a variable speed system of gearing, a first shaft, a series of gears loose thereon, a pair of clutching devices simultaneously actuated for alternately engaging certain of said gears in driving relation with said shaft, a second shaft, a sleeve loose thereon, a pair of gears loose on said sleeve in mesh respectively with gears on the first shaft, clutching devices for alternately connecting said gears to said sleeve, a second pair of gears loose on said second shaft, one of which is in driving connection with said sleeve, clutching devices for alternately connecting said gears to said second shaft, a third shaft, a series of gears fixed thereon in mesh respectively with said gears loose on said second shaft, a fourth shaft, two loose and one fixed gears thereon in mesh respectively with three of the gears on the first shaft, and clutching devices for alternately clutching said loose gears to said fourth shaft, whereby, through the manipulation of the clutches of the system, twelve changes of speed may be imparted from said first shaft to said second shaft, substantially as described.

In testimony whereof, I have hereunto set my hand.

HERMAN W. SCHATZ.

Witnesses:
 OLIVER B. KAISER,
 S. BECK.